United States Patent

Cordier

[11] 3,902,112
[45] Aug. 26, 1975

[54] FREQUENCY CONVERTER FOR POWER SUPPLY TO VARIABLE SPEED SYNCHRONOUS MACHINES

[75] Inventor: Jean-Pierre Jules Cordier, Montigny Le Tilluel, Belgium

[73] Assignee: Westinghouse Electric Corporation, Pittsburgh, Pa.

[22] Filed: Mar. 29, 1974

[21] Appl. No.: 456,422

[30] Foreign Application Priority Data
Apr. 2, 1973 Belgium ............................. 797646

[52] U.S. Cl. .................. 321/66; 318/171; 318/227; 318/231; 321/68
[51] Int. Cl. ....................... H02p 9/42; H02m 5/44
[58] Field of Search ............ 321/60, 61, 65, 66, 68, 321/26; 323/60, 61; 318/171, 231, 227, 225, 230

[56] References Cited
UNITED STATES PATENTS

| 2,442,258 | 5/1948 | Boyer | 321/66 |
| 3,624,472 | 11/1971 | Graham | 318/227 |
| 3,629,684 | 12/1971 | Christen et al. | 321/68 X |

*Primary Examiner*—Gerald Goldberg
*Attorney, Agent, or Firm*—J. J. Wood

[57] ABSTRACT

Frequency converter having the advantage of a better performance, reduced voltage stresses on the thyristors and lower rate of harmonics in the supply line. It comprises a transformer having two separate secondary windings which supply power to the converter through a smoothing d.c. reactor connected at each end to three thyristors or diodes connected respectively to said secondary windings.

Applicable for power supply to variable speed synchronous machines.

4 Claims, 5 Drawing Figures

FREQUENCY CONVERTER FOR POWER SUPPLY TO VARIABLE SPEED SYNCHRONOUS MACHINES

CROSS REFERENCE TO RELATED APPLICATION

Right to priority is claimed under the International Convention for the Protection of Industrial Property based on the patent application first filed in Belgium on Apr. 2, 1973, Ser. No. 797,646 for: "Convertisseur de frequence pour l'alimentation de machines synchrones a vitesse variable."

BACKGROUND OF THE INVENTION

1. Field of the Invention

The present invention concerns frequency-changers employed to energize variable speed synchronous machines (motors) from any alternating current network and, in particular, from an industrial three-phase power supply.

2. Description of the Prior Art

FIG. 1 shows the circuit diagram of a known converter of this type. It consists of three groups, each group consisting of three branches in parallel of two series-connected thyristors, the two terminals of each group being connected, via a winding of a three-phase smoothing choke, to a phase of a power supply network R, and the points common to the two thyristors of one branch being connected together with the homologous points in the three groups and with the terminals of the synchronous machine to be energized, circuits being provided cyclically to trigger (turn-on) the different thyristors in the manner desired in accordance with the required speed of the synchronous machine.

In the circuit diagram shown in FIG. 1, R represents the three-phase power supply, $L_1$ and $L_2$ are the two three-phase smoothing chokes, MS the synchronous machine, and $(T_{11}, T_{12})$, $(T_{21}, T_{22})$ ... and $(T_{91}, T_{92})$ are the thyristors in the different branches of the circuit.

The three-phase smoothing chokes $L_1$ and $L_2$ present numerous drawbacks. Their multiple windings are notably traversed by incomplete current waves, as a result of which the active part of the smoothing choke is poorly utilized. In addition, in these known devices, the thyristors are regularly subjected to a voltage which is the instantaneous sum of the network voltage and that of the machine, these voltages having the same maximum amplitude. Finally, these devices do not allow the mixed employment of thyristors and of diodes which is known to be very advantageous from the standpoint of the reactive energy consumed in the network, and thus from the economical point of view.

The present invention eliminates all these drawbacks. It enables the smoothing chokes with multiple windings to be replaced by a conventional dc reactor (inductance). It reduces the voltage requirements for the thyristors of the circuit and enables the converter to be operated in such a way as to make the reaction optimal vis-à-vis the power supply network from the point of view of the re-injected harmonics, and the dissipated reactive power. Finally, the invention lends itself to a variant in which a mixture of thyristors and diodes may be employed, which is of particular importance from the economical point of view.

SUMMARY OF THE INVENTION

A frequency converter is provided for energizing a variable speed synchronous machine having three groups of thyristors, each group consisting of three parallel branches of two series-connected thyristors, the arrangement being such that the points common to said two series connected thyristors are connected with the homologous points in the three groups and with the terminals of the synchronous machine to be energized. A three-phase power transformer has its primary connected to a power supply, and two separate secondary windings, the three output terminals of each secondary including a thyristor or a diode in each phase and being respectively connected to one of the extremities of said three groups, the phase thyristors or diodes having a conduction direction opposite to that of the thyristors in the aforesaid three groups, these phase thyristors respectively having a common point, the two such common points for each secondary being connected to the terminals of a direct current smoothing reactor.

In alternate embodiments one of said secondaries of the power transformer is delta connected while the other is star connected.

DESCRIPTION OF THE EMBODIMENTS

The frequency converter made in accordance with the invention contains three groups, each consisting of three branches connected in parallel, and each branch consisting of two thyristors in series, the common points of the two thyristors of each branch being connected with the homologous points in the three groups, and with the terminals of the synchronous machine to be energized, the said frequency converter being characterized by the incorporation of a three-phase power transformer having a primary, which is connected to the power supply network R, and two separate secondaries whose respective sets of three terminals are, on the one hand, connected respectively to one of the extremities of three groups of three parallel branches respectively consisting of two series-connected diodes and, on the other hand, to two sets of three thyristors or three diodes whose direction of conduction is opposed to that of the thyristors in the said three groups, the three thyristors or diodes in each set having a common point, with the common points of each set being connected to the terminals of a dc smoothing reactor.

Figure 3:
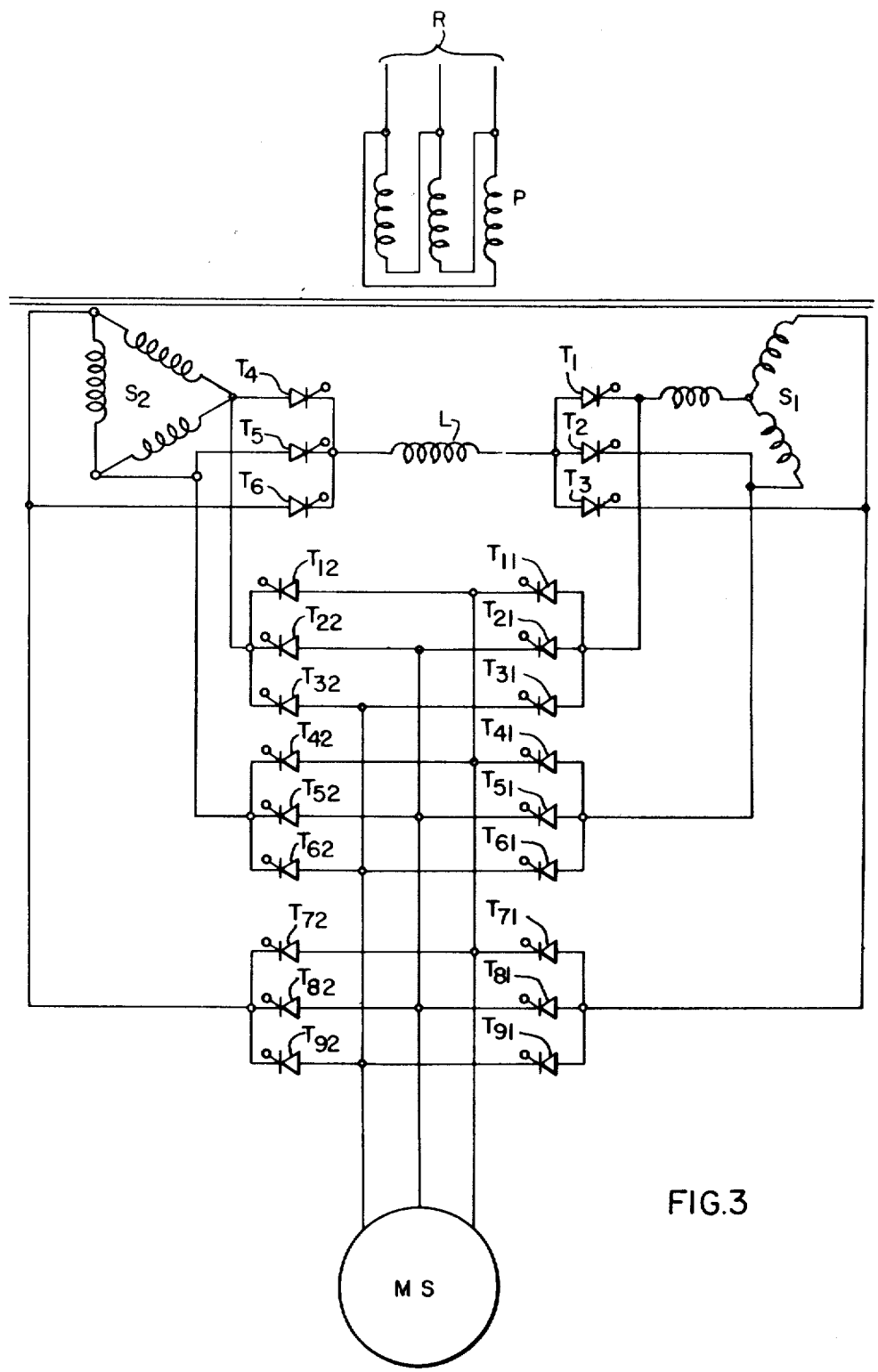
FIG. 3 is an electrical schematic of the frequency converter having a delta connected secondary in accordance with the invention.
Figure 5:
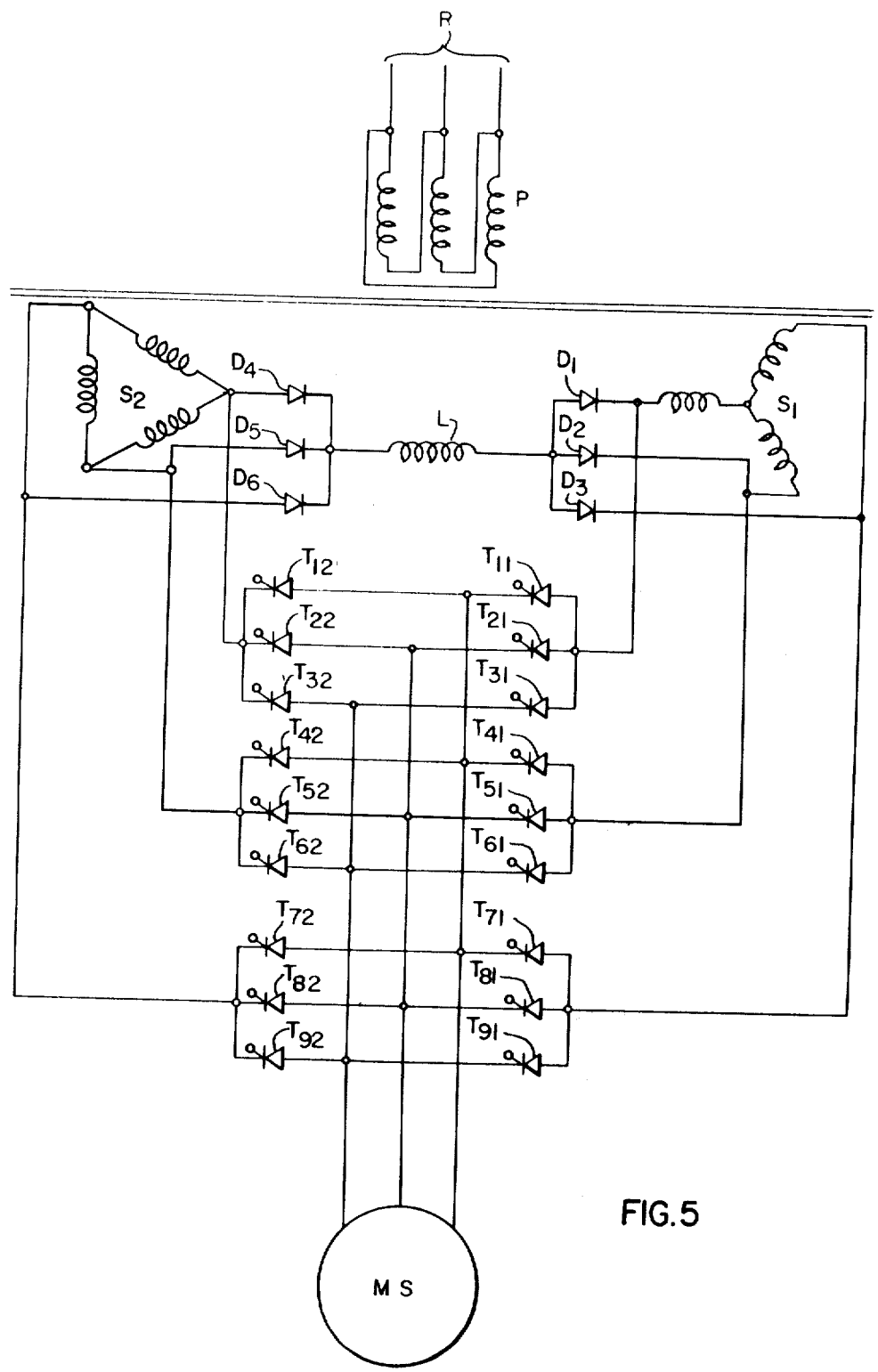
FIG. 5 is an electrical schematic of the frequency converter having a delta connected secondary and phase diodes D1, — D6 in the transformer secondaries in accordance with the invention.

In accordance with another characteristic of the invention, one of the secondaries of the power transformer is delta connected, while the other is star or Y connected (FIGS. 3 and 5).

Figure 2:
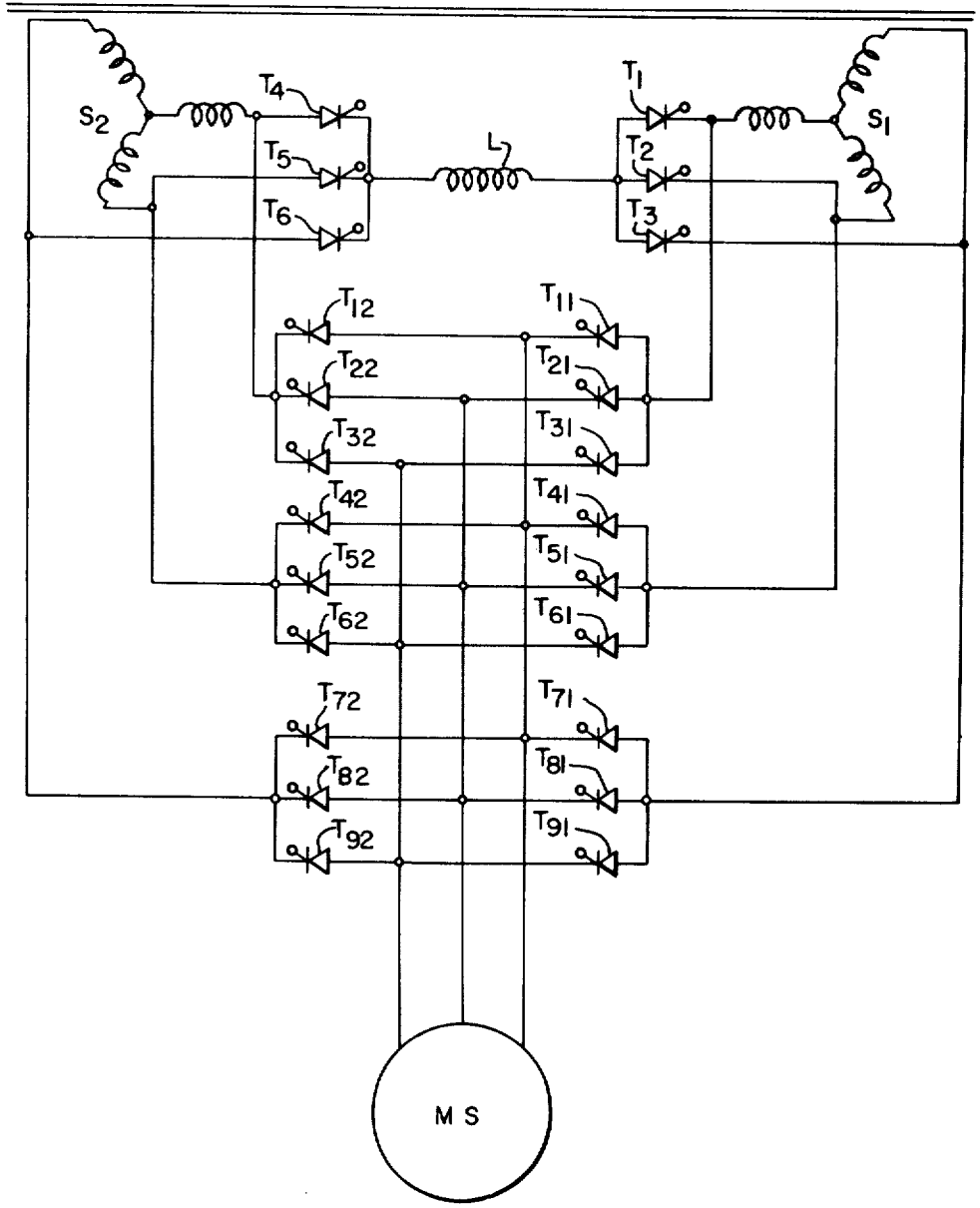
FIG. 2 is an electrical schematic of a frequency converter for energizing variable speed synchronous machines in accordance with the invention.

The following description and FIG. 2 of the drawings refer to particular examples of realization in accordance with the invention.

Figure 1:
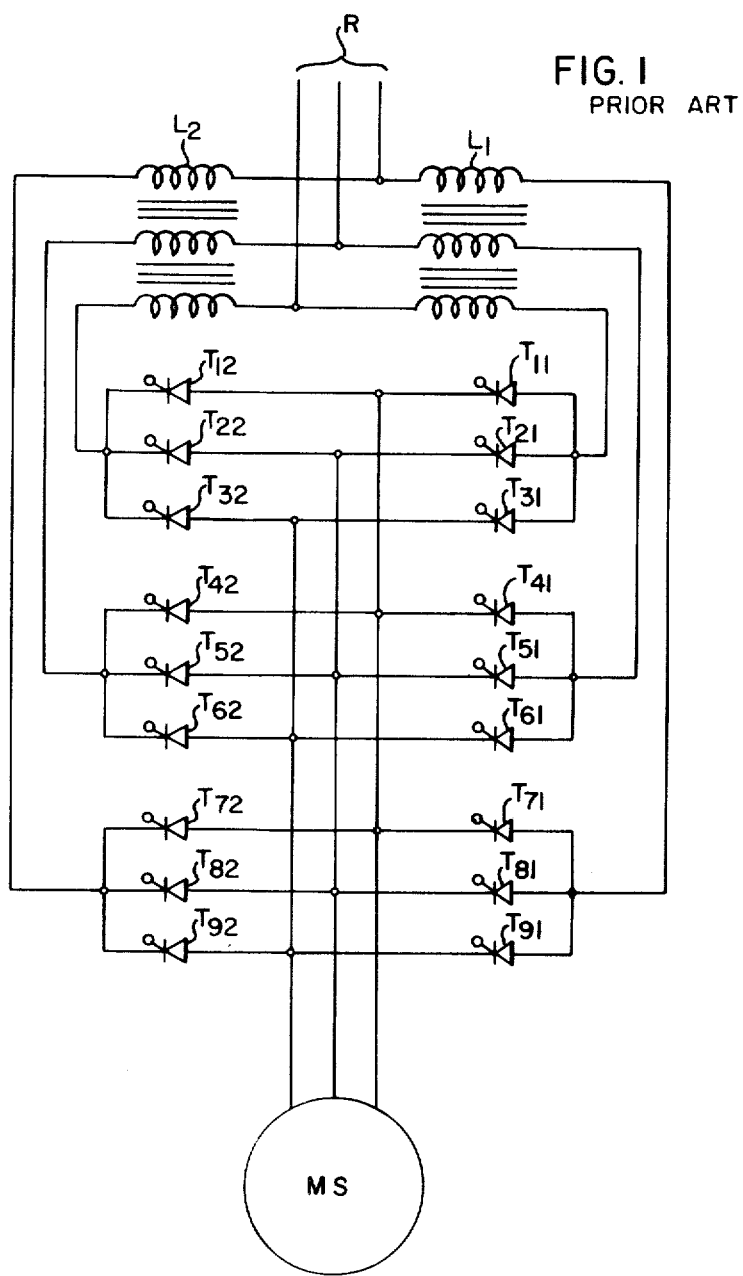
FIG. 1 is an electrical schematic of a prior art frequency converter.

FIG. 2 illustrates a converter which is equipped, in a manner similar to that of FIG. 1, with thyristors ($T_{11}$, $T_{12}$), ($T_{21}$, $T_{22}$) . . . and ($T_{91}$, $T_{92}$), and which energizes synchronous machine MS. Elements in FIG. 2 which are identical to those in FIG. 1 are given the same symbols.

The various thyristors ($T_{11}$, $T_{12}$), ($T_{21}$, $T_{22}$) . . . ($T_{91}$, $T_{92}$) are divided into three groups consisting of three series-connected pairs connected in parallel, the arrangement being such that homologous points common to the different pairs are connected together and to the synchronous machine MS.

The converter is energized by a three-phase transformer whose primary, which is connected to the power-supply network R, is connected in delta, the said transformer being provided with two star-connected secondaries $S_1$ and $S_2$ which are connected to three groups of thyristors as shown in FIG. 2.

In addition, the two secondaries $S_1$ and $S_2$ are each connected to three thyristors, respectively labelled $T_1$, $T_2$, $T_3$ and $T_4$, $T_5$, $T_6$ (or FIGS. 4, 5: diodes $D_1$, $D_2$, $D_3$, and $D_4$, $D_5$, $D_6$) having a common point and whose sense of conduction is opposite to that of the principal thyristors. The points common to thyristors $T_1$, $T_2$, $T_3$ and $T_4$, $T_5$, $T_6$ (and diodes $D_1$, $D_2$, $D_3$ and $D_4$, $D_5$, $D_6$) are connected to the terminals of a dc smoothing reactor L.

The dc circuit of reactor L may, if necessary, include the excitation of the synchronous machine and the measuring circuits for the regulation. It is possible to incorporate an ultra-fast dc circuit breaker, a device which is conventional and which has proved itself with rectifiers. Protection of the device is thus much simpler and less expensive than that for the known circuit shown in FIG. 1 which requires the use of much more expensive ultra-rapid three-phase circuit breakers, the device in accordance with the invention also consuming less current.

As shown in FIGS. 3 and 5 it is advantageous to employ a transformer having one secondary connected in star and one secondary in delta because such an arrangement automatically eliminates part of the harmonics normally returned to the network. The line voltage of each of the secondaries is equal to half the value necessary in the case of the conventional circuit shown in FIG. 1.

The principal thyristors ($T_{11}$, $T_{12}$), ($T_{21}$, $T_{22}$) . . . ($T_{91}$, $T_{92}$) are subjected to a maximum instantaneous voltage which is not more than three quarters of that occurring in the conventional circuit shown in FIG. 1 because the instantaneous sum of the voltages calls into action the voltage of the machine, and the voltage of a network which is only half of the voltage of the power-line network which has an amplitude equal to the maximum in the voltage of the machine.

The maximum voltage requirement of the auxiliary thyristors $T_1$ to $T_6$ is set by the voltage of the secondaries $S_1$ and $S_2$, that is, a quarter of the instantaneous maximum voltage at the terminals of the thyristors of the conventional circuit illustrated in FIG. 1.

Figure 4:
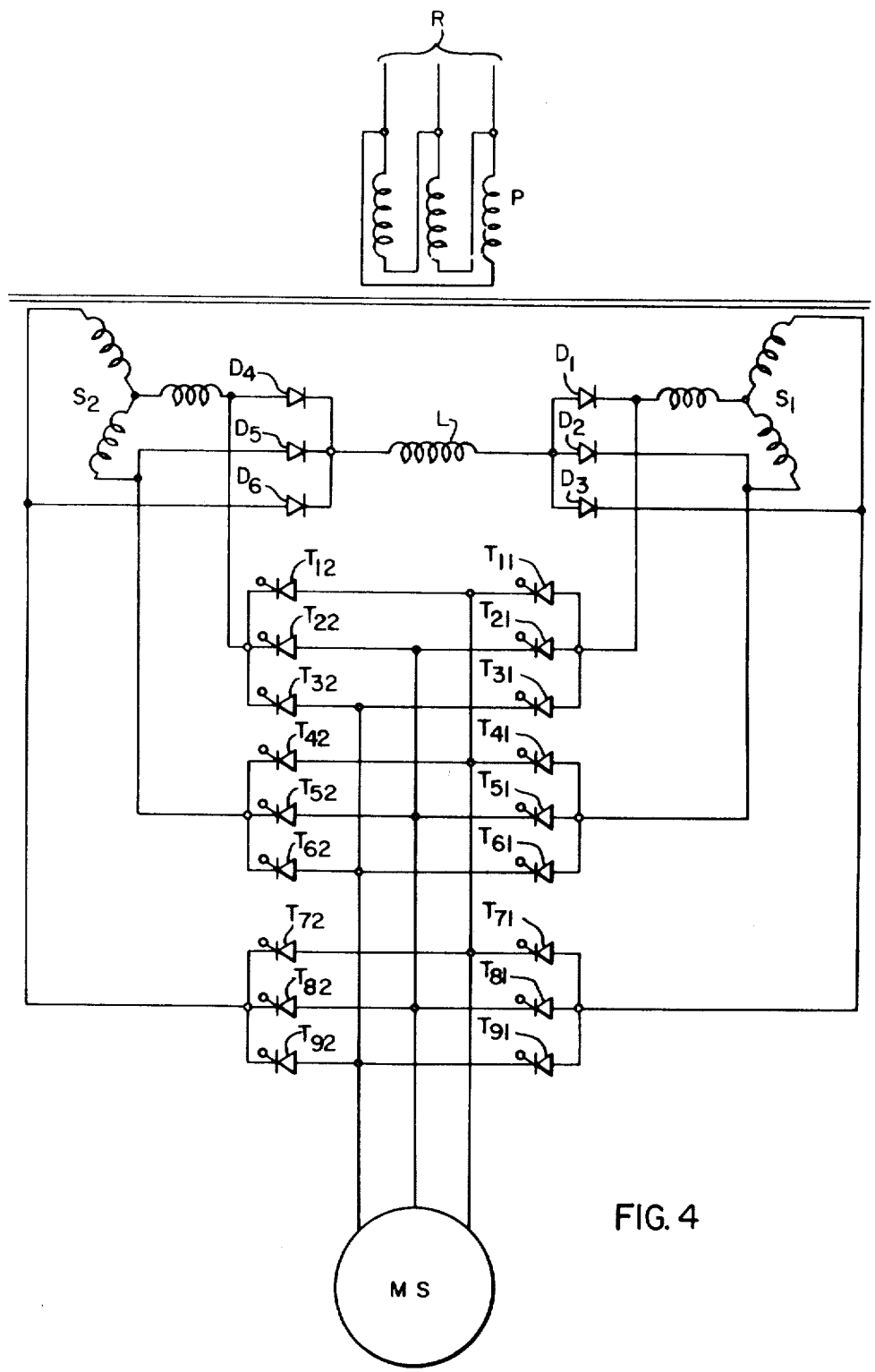
FIG. 4 is an electrical schematic of the frequency converter having phase diodes D1 ... D6 in the transformer secondaries in accordance with the invention.

Finally, the device described above makes it possible to improve the power factor by employing a suitable thyristor control. A variant of the circuit shown in FIG. 2 may be obtained by replacing the auxiliary thyristors $T_1$, $T_2$ . . . $T_6$ by diodes as illustrated in FIGS. 4 and 5. This arrangement possesses all the advantages of the circuit shown in FIG. 2 along with the economy effected by such a replacement. However, improvement in the power factor is, in this case, natural, and no longer results from a particular control of the thyristors.

However, this variant only permits the transfer of energy from the power supply network R toward the machine. It is thus particularly suitable to applications where the machine torque is essentially motor.

It is clearly evident that the thyristors employed in the above-described circuits may be controlled in any suitable manner and that other variants may be conceived which do not depart from the scope of the invention.

I claim:

1. A frequency converter for energizing variable speed synchronous machines having three groups of thyristors, each group consisting of three parallel branches of two series-connected thyristors, the arrangement being such that the points common to said two series connected thyristors are connected with the homologous points in the three groups and with the terminals of the synchronous machine to be energized, comprising a three-phase power transformer having its primary connected to a power supply and two separate secondary windings, the three output terminals of each secondary including a thyristor in each phase and being respectively connected to one of the extremities of said three groups, the phase thyristors having a conduction direction opposite to that of the thyristors in the aforesaid three groups, these phase thyristors respectively having a common point, the two such common points for each secondary being connected to the terminals of a direct current smoothing reactor.

2. A frequency converter in accordance with claim 1 wherein one of the secondaries of the said power transformer is delta connected while the other is star connected.

3. A frequency converter for energizing variable speed synchronous machines having three groups of thyristors, each group consisting of three parallel branches of two series-connected thyristors, the arrangement being such that the points common to said two series-connected thyristors are connected with the homologous points in the three groups and with the terminals of the synchronous machine to be energized, a three-phase power transformer having its primary connected to a power supply and two separate secondary windings, the three output terminals of each secondary including a diode in each phase and being respectively connected to one of the extremities of said three groups, the phase diodes having a conduction direction opposite to that of the thyristors in the aforesaid three groups, these phase diodes respectively having a common point, the two such common points for each secondary being connected to the terminals of a direct current smoothing reactor.

4. A frequency converter in accordance with claim 3 wherein one of the secondaries of the said power transformer is delta connected while the other is star connected.

* * * * *